2,919,222

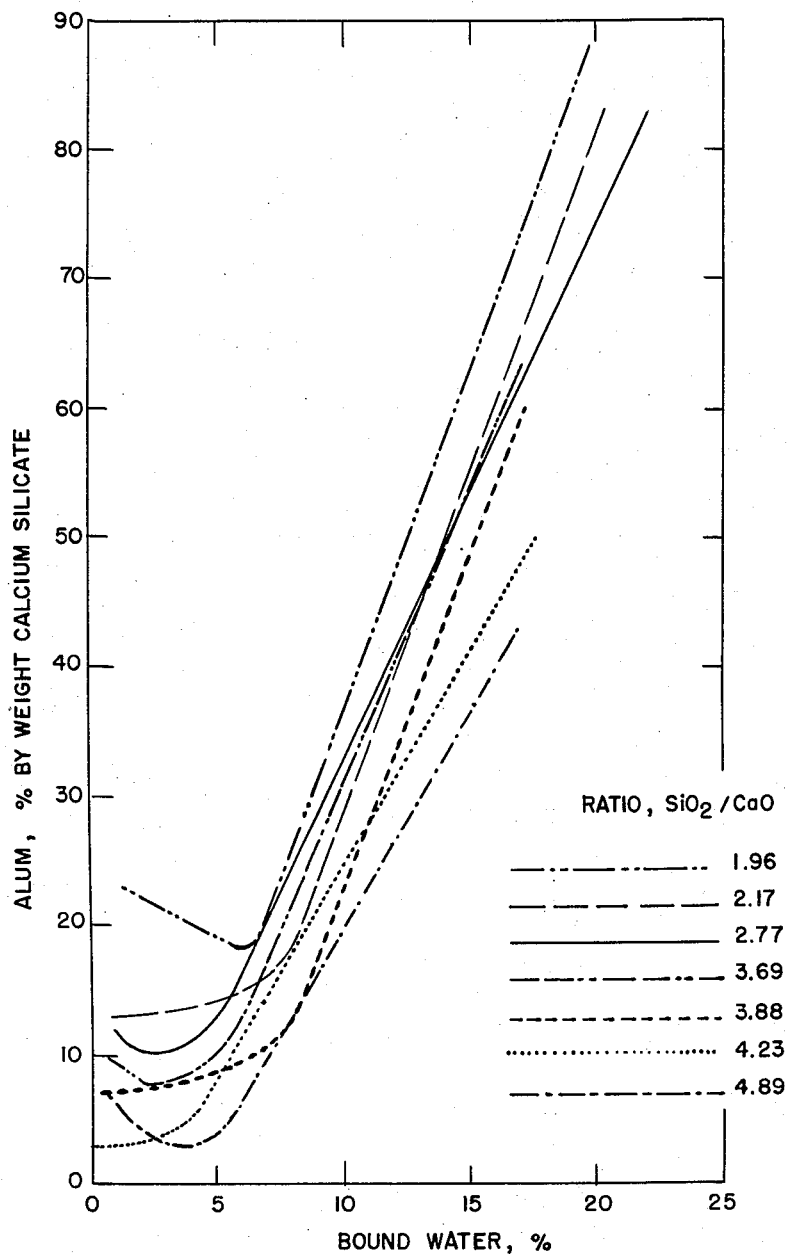

PAPER MAKING PROCESS AND PRODUCT

George E. Hall, Jr., Wyandotte, Mich., assignor to Wyandotte Chemicals Corporation, Wyandotte, Mich., a corporation of Michigan Application November 5, 1954, Serial No. 467,021

5 Claims. (Cl. 162—181)

This invention relates to a process for making paper and to the novel furnish and paper resulting from this process.

In the art of making paper, the pulp is delivered from digesters to washers, then to the extractors, and is subsequently bleached if a light-colored paper is desired. From the extractors or the bleaching station the wetlap or blanket of pulp passes on to the beaters. The pulp, sizing material, filler and other ingredients added to the beater are referred to as the furnish.

The addition of finely divided, hydrated calcium silicate pigment as a filler forming part of the furnish is a relatively recent development. These pigments are currently obtained by precipitation procedures, since naturally occurring calcium silicates have not been found to be satisfactory. Papers produced from furnishes containing hydrated calcium silicate filler are characterized by a high opacity, good whiteness or brightness and a desirable increase in bulk. The drawback to these calcium silicate fillers lies in their alkalinity. Usually the pH of the furnish is adjusted to between 4.5 and 6.5 in order to produce a web of the desired strength. Normally the sizing agent is set with alum to this pH, but the alkalinity of the calcium silicate requires additional alum or other neutralizing agent to reset the pH after the addition of the filler. Wherever the term "alum" is used throughout the specification and claims, it refers to what is known in the trade as paper makers' alum, $$Al_2(SO_4)_3 \cdot 18H_2O$$

In addition to the increased cost arising from higher alum requirements, gradual hydrolysis produces increasing amounts of $CaSO_4$ which deposits on critical parts of the paper making machinery and eventually may require shutdown of the process. Agglomerates of $CaSO_4$ may also detrimentally affect the quality of the paper produced.

An object of this invention, therefore, is to provide a method of making paper containing hydrated calcium silicate filler, wherein the amount of additional alum or other neutralizing agent that is required is substantially reduced.

Another object of this invention is to provide a furnish containing calcium silicate as a filler which reduces the amount of alum or other neutralizing agent necessary to lower the pH to that required for web formation.

Still another object of the present invention is to provide a paper containing hydrated calcium silicate pigment which has improved qualities over those of other similar papers containing currently employed hydrated calcium silicate pigments.

Other objects and advantages of the present invention will become apparent from the following detailed description thereof when read in conjunction with the accompanying drawing wherein the single figure represents a graph which shows how the alum requirements of a variety of pigments having varying ratios of $SiO_2/CaO$ are affected by the reduction in the bound water content of these pigments.

In general, it has been found that, by reducing the bound water content of a hydrated calcium silicate pigment having an $SiO_2/CaO$ ratio of not more than 5:1, less alum or other neutralizing agent is required to readjust the pH of the furnish, and the resulting paper has improved properties over those normally obtained with other similar type calcium silicate fillers. By the term "bound water" is meant chemically combined water. Bound water is determined by heating the pigment to be tested to 100° C. for a period of two hours, weighing the sample, and then calcining the pigment to a temperature of 1000° C. for a period of two hours, and subsequently reweighing. The difference in these two weights constitutes the amount of bound water, which is usually expressed as percent by weight of the original pigment.

The bound water content of any given hydrated calcium silicate pigment will be constant, or substantially so, in the as-precipitated condition from one batch to another. As used in this specification and the following claims, the term "reduced bound water content" means a bound water content that is less than that which that pigment contained in the as-precipitated condition.

This effect of reducing the bound water upon the amount of alum or other neutralizing agent that is required to reset the pH of the furnish is clearly shown in Example 1.

EXAMPLE 1

A 50% groundwood-50% bleached sulphite furnish was beaten to 72° Schopper and then filled with a total of 15% by weight of filler compounds of which 5% is clay and the balance calcium silicate. A series of hydrated calcium silicate fillers containing varying amounts of bound water were employed and were added to separate portions of the furnish, all of the silicates having a ratio of $SiO_2/CaO$ of approximately 3.3. Different percentages of bound water in the calcium silicate filler added were obtained by heating the pigment to temperatures of 100–700° C. A 50-pound basis weight sheet was made from these different furnishes and the following test results obtained. "Basis weight" is defined throughout this specification as the weight of 500 sheets whose dimensions are 25" x 38". In each instance the furnish was set to a pH of 5 with alum.

Table I

|  | Control, No Filler | Calcium Silicate, Percent Bound Water | | | | | |
|---|---|---|---|---|---|---|---|
|  |  | 15.5 | 13.0 | 10.3 | 5.6 | 1.5 | 0.2 |
| Brightness | 46 | 58 | 59 | 59 | 58 | 59 | 59 |
| Opacity | 95 | 93 | 98 | 98 | 98 | 98 | 98 |
| Caliper | 4.5 | 4.5 | 4.8 | 5.0 | 5.0 | 4.9 | 5.3 |
| Bulk 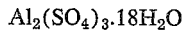×100 | 8.9 | 9.2 | 9.3 | 9.6 | 9.8 | 9.6 | 9.9 |
| Retention of Filler |  | 92.2 | 97.4 | 96.8 | 97.4 | 100 | 98.7 |
| Alum, percent by weight of calcium silicate |  | 50 | 35 | 10 | 1 | 0 | 0 |

It is apparent from the above data that the brightness and opacity of the pigments are the same regardless of the bound water content, but the caliper and, therefore, the bulk increases as the bound water content decreases. Also, there seems to be some tendency for a greater retention of filler where the calcium silicate contains smaller amounts of bound water. It is immediately apparent from the above table that the percent of bound water in the pigment has a pronounced effect upon the amount of alum required to reset the pH. By reducing the bound water content to approximately 10%, the amount of alum required is decreased to 20% of that originally required, and only 2% of the original amount is needed where the bound water content is approximately 5%.

Another factor which affects the amount of alum required is the ratio in the calcium silicate pigment of the $SiO_2$ to $CaO$. The effect of the $SiO_2/CaO$ ratio is brought out in Examples 2 and 3.

EXAMPLE 2

To the same furnish as set forth in Example 1 above was added precipitated, finely divided, hydrated calcium silicates of varying $SiO_2/CaO$ ratios. Alum was then added to reset the pH at 5.0. Again 50-pound basis sheets were made and tested with the results shown in the following table:

Table II

|  | Control, No Filler | Calcium Silicate—$SiO_2$/$CaO$ Ratios | | | |
| --- | --- | --- | --- | --- | --- |
|  |  | 3.14 | 3.38 | 11.75 | 21.1 |
| Brightness | 46 | 58 | 59 | 58 | 59 |
| Opacity | 95 | 98 | 98 | 97 | 98 |
| Caliper | 4.5 | 4.5 | 4.8 | 5.2 | 4.7 |
| Bulk $\frac{caliper}{basis\ weight} \times 100$ | 8.9 | 9.2 | 9.3 | 9.3 | 7.9 |
| Retention |  | 92.3 | 97.4 | 96.7 | 96.7 |
| Alum, percent by weight of calcium silicate |  | 50 | 35 | 0 | 0 |

As the ratio of $SiO_2$ to $CaO$ increases, the alum requirement decreases until at a ratio of 11.75 no additional alum is required to obtain a pH of 5.0. A curve based upon the above data shows that the alum requirement has become insignificant at an $SiO_2/CaO$ ratio of 5:1.

EXAMPLE 3

In order to show that the effect of the $SiO_2/CaO$ ratio upon the alum requirement is independent of the manner of making the pigment, the procedure outlined in U.S. Patent No. 2,237,374 was used to make a high silica pigment. In this process one part of sodium silicate (42° Baumé, ratio $SiO_2/Na_2O=3.4$) was diluted with two parts of water and, while stirring vigorously, one part of a 10% water solution of calcium chloride was added. A precipitate formed immediately and the calcium silicate slurry was stirred to effect uniform mixing. Hydrochloric acid was then added (made by adding three parts water to one part 37% HCl) until the slurry reached a pH of 7, as registered by a glass electrode. The precipitate was washed with water and dried in an electric oven at 105° C. until a constant weight was reached. This dried precipitate was then crushed in a mortar and pestle. The pigment analyzed as follows:

Ignition loss _____ percent __ 11.82
$SiO_2$ _____ do ____ 80.00
$CaO$ _____ do ____ 8.18
$SiO_2/CaO$ mole ratio _____ 9.13
Bound water _____ percent __ 8.23

Upon titrating this pigment with alum, 10% alum was required to lower the pH to 5. When this same pigment was calcined at 500° C. for 60 minutes, the bound water content was reduced to 1.43% and the alum requirement decreased to 1%. In view of the margin of error at these low alum requirements (±4%), and the fact that a 10% or even 15% alum requirement is quite satisfactory, there is no real advantage to be obtained by calcining a pigment having a 9:1 $SiO_2/CaO$ ratio.

It is thus seen that both the bound water content and the $SiO_2/CaO$ ratio of the calcium silicate filler are critical in determining the amount of alum required to reduce aqueous compositions containing these pigments of these fillers to an acid pH. The exact interrelationship of these two factors becomes apparent from the data set forth in Example 4.

EXAMPLE 4

Precipitated, finely divided, hydrated calcium silicate pigments of varying $SiO_2/CaO$ ratios were prepared by adding an aqueous solution of waterglass to an aqueous solution of calcium chloride to produce a finely divided, amorphous precipitate. Where the $SiO_2/CaO$ ratio exceeded 3.4, acid was added to the calcium chloride solution to increase the $SiO_2$ content of the pigment. Different portions of the pigments thus obtained were heated at temperatures of 100° C., 350° C., 500° C. and 700° C. for a period of four hours. Samples of these pigments were then titrated with alum to a pH of 5.0 with the following results:

Table III

| $SiO_2/CaO$ Ratio | 100°C. | | 350°C. | | 500°C. | | 700°C. | |
| --- | --- | --- | --- | --- | --- | --- | --- | --- |
|  | bound water, percent | alum, percent by wt. of calcium silicate | bound water, percent | alum, percent by wt. of calcium silicate | bound water, percent | alum, percent by wt. of calcium silicate | bound water, percent | alum, percent by wt. of calcium silicate |
| 1.96 | 19.5 | 88 | 7.3 | 22 | 6.2 | 18 | 1.1 | 23 |
| 2.17 | 20.3 | 83 | 15.5 | 18 | 3.6 | 13 | 0.9 | 13 |
| 2.77 | 19.6 | 70 | 5.6 | 15 | 3.5 | 10 | 0.7 | 12 |
| 3.69 | 17.1 | 63 | 5.1 | 15 | 2.2 | 25 | 0.4 | 10 |
| 3.88 | 17.1 | 60 | 4.1 | 10 | 2.0 | 7 | 0.3 | 7 |
| 4.23 | 17.6 | 50 | 4.9 | 5 | 2.3 | 3 | 0.3 | 3 |
| 4.89 | 16.9 | 43 | 5.4 | 5 | 2.2 | 3 | 0.4 | 7 |

The data in Table III are plotted in the graph shown in Fig. 1. Both the above table and the graph show that the greatest reduction in alum requirement occurs in the initial losses of bound water. This reduction in alum requirement is striking in all pigments which contain not more than 10% bound water. As the bound water is further reduced, less reduction in the alum requirement is noted until at or about 3.5% bound water content a maximum reduction of the alum requirement is reached. In fact, below about 5% bound water (or above a calcining temperature of 500° C.) very little reduction in alum requirement is effected.

It is also important to note in the graph that as the $SiO_2/CaO$ ratio increases the alum requirement at any given bound water content decreases. This substantiates the data set forth above in Examples 2 and 3. Where the ratio of $SiO_2/CaO$ is more than 5:1 two things happen. First, the pigment is no longer a calcium silicate in the true sense, but rather becomes a mixture of, or coprecipitate of (depending upon how it is made), calcium silicate and silica. Secondly, the reduction in CaO content reduces the alkaline nature of the pigment, so that only an insignificant amount of alum is required to set the pH at 5. Consequently, pigments having $SiO_2/CaO$ ratios over 5:1 are a different type of pigment from those having lower ratios and need little or no alum to reset to an acid pH. Thus, reduction in the bound water content of these higher ratio pigments does not effect the remarkable reduction in alum requirement as is the case for those below the 5:1 ratio. These higher ratio pigments, while eliminating the requirement of added alum to reset to acid pH, are not a practical answer to the present problem because of their extremely high cost of production.

The decrease in alum requirement due to the change in ratio of $SiO_2/CaO$ can be explained on the basis that, as the amount of CaO is reduced, the alkalinity of the pigment is similarly decreased. No such simple explanation is available for teaching why the decrease in bound water content has such a remarkable effect upon reducing the alum requirement. Reduction in the bound water content in no way affects the alkalinity of the pigment, as far as can be determined by pH tests, and this fact is shown in Example 5.

EXAMPLE 5

A calcium silicate pigment having an $SiO_2/CaO$ ratio of about 3.3 was prepared and separate portions of this pigment were then calcined at different temperatures. The resulting pigments were titrated with alum to a pH of 5.5 and the data obtained is set forth in the following table:

Table IV

| Calcination Temperature | Percent Bound Water | pH | Alum, Percent by wt. of Calcium Silicate |
|---|---|---|---|
| 100 | 15.5 | 9.1 | 60 |
| 300 | 13.0 | 9.1 | 40 |
| 500 | 5.6 | 9.0 | 4 |
| 600 | 1.5 | 9.0 | 2 |
| 700 | 0.2 | 9.1 | 2 |

It is seen from the above table that, as the bound water decreased, the pH of the resulting pigment was constant, but the alum requirement greatly decreased. Consequently, the novel result achieved by practicing the present invention is not one which could in any way be predicted by previously known facts and is, even at the present time, a result that cannot be completely explained.

The present invention is not restricted in any way to a particular paper pulp or to a particular furnish composition. The composition of the furnish and the particular pulp employed do not appear to have any effect whatsoever upon the salient fact that reduction of the bound water content of the calcium silicate pigment reduces the alum requirement, as has been explained heretofore. This fact is further illustrated in Examples 6 and 7.

EXAMPLE 6

A catalogue furnish made from a 60% groundwood–40% bleached sulphite pulp and a calcium silicate pigment having an $SiO_2/CaO$ ratio of approximately 3.3, was beaten to 70° Schopper. This furnish was then titrated with alum to a pH of 4.5. In a second test, an uncoated offset furnish was prepared from a 50% groundwood–50% bleached sulphite to which was added a 50–50 mixture of clay and the calcium silicate pigment defined immediately above. This furnish was beaten to 70° Schopper and then titrated with alum to a pH of 5.5 A series of tests were run on each of these furnishes with calcium silicate pigments calcined at temperatures of 100° C., 300° C., 500° C., 600° C. and 700° C. for a period of four hours. The data thus obtained are set forth in the following table:

Table V

| Calcination Temperature | Alum, Percent By Wt. Calcium Silicate | |
|---|---|---|
| | 4% Calcium Silicate [1] | 7.5% Clay, 7.5% Calcium Silicate [2] |
| 100 | 90 | 52 |
| 300 | 50 | 30 |
| 500 | 10 | 10 |
| 600 | 10 | 0 |
| 700 | 0 | 0 |

[1] Set to a pH of 4.5. [2] Set to a pH of 5.5.

The alum requirements shown in the above table follow the same pattern as in the case where the pigment is titrated by itself or in paper furnishes of other compositions. This effect of reduced alum requirement obtained by decreasing the bound water content is thus independent of the furnish composition itself.

EXAMPLE 7

Pulp comprising 15% rag and 85% bleached sulphite was beaten to a freeness of about 60° Schopper and calcium silicate pigments were added thereto. These pigments all had an $SiO_2/CaO$ ratio of about 3.3 and were calcined at different temperatures to obtain 15%, 10% and 5% bound water, respectively. $TiO_2$ pigment was added on a 50–50 basis with the calcium silicate pigment, so that each sample contained a total of 3.5% by weight pigment. The pulp containing these pigments as fillers was titrated with alum to a pH of 5.0 with the following results:

| Percent Bound Water in Calcium Silicate | Alum, Percent By Wt. of Calcium Silicate |
|---|---|
| 15 | 48 |
| 10 | 10 |
| 5 | 9.5 |

In view of the above data, it is apparent that the presence of different type pulp, or another pigment filler, in no way interferes with the reduction in alum effected by the decrease in percent of bound water.

Not only does the reduction in bound water content effect a decrease in the alum requirement as has been discussed above in detail, but such treatment of the calcium silicate pigment also results in improved qualities of the paper produced as compared to paper obtained using similar but untreated calcium silicate fillers. This improvement in properties is shown in the test set forth in Example 8.

EXAMPLE 8

Clay, a calcium silicate pigment dried at 100° C. having a ratio of $SiO_2/CaO$ of 3.3 and a bound water content of approximately 15%, and a second calcium silicate pigment having the same $SiO_2/CaO$ ratio but having the bound water content reduced to 5.0% were added to separate portions of a pulp comprising 50% bleached kraft and 50% groundwood. Tests were run at 2, 4 and 8% by weight of pigment and papers were sheeted off at 30, 35 and 40-pounds basis weight. From the mass of data thus obtained the expected physicals for a 31-pound basis weight paper were derived and are set forth in the following table for a paper having a 7% total ash content:

Table VI

| Property | Clay | Calcium Silicate | |
|---|---|---|---|
| | | 15% Bound Water | 5% Bound Water |
| Opacity | 88.5 | 88.5 | 90.7 |
| Caliper | 2.7 | 3.5 | 3.2 |
| Tear | 5 | 5.6 | 5.6 |
| Tensile | 6.3 | 6.3 | 6.3 |

The above data clearly show that the calcium silicate pigment containing 5% of bound water is definitely superior to both the clay and the uncalcined calcium silicate in opacity and substantially equal in all other properties. This improvement in opacity could in no way be predicted as logically arising merely from the reduction in bound water content.

The importance of reduction in the alum requirement resides not only in decreasing the cost of the alum, which is normally used in the process in a ratio of about one pound of alum to two pounds of calcium silicate, but also in entirely eliminating in some cases the additional step of resetting the pH of the furnish following the addition of the filler. While calcium silicates have been known for some period of time, and while their use in paper has been contemplated for many years, it has been only recently that these pigments have been seriously considered as potential fillers on a large scale basis. One reason for this delay has been the cost of these pigments as compared to clay and other similar type fillers. Production costs on these pigments have been greatly reduced, but they are still high enough so that the cost of the added alum required with the usual or standard type of calcium silicate filler constitutes a serious drawback tending to retard widespread use of these pigments in paper. Also, as has been pointed out above, the added alum results in the formation of $CaSO_4$ which deposits on the paper making machinery and becomes a very real nuisance. It is for this reason that the present invention wherein the alum requirement is greatly reduced by decreasing the bound water content of the calcium silicate pigment is of vital importance in the application of the calcium silicate pigments in the paper field.

As has been noted hereinabove, the improved process of making paper above defined results in a paper having an increased opacity over that obtained using uncalcined calcium silicate. Furthermore, paper produced according to the present invention has a high caliper and consequently a high bulk, both of which factors are desirable. It has also been noted that the filler retention resulting from the present process is improved over that obtained where merely standard calcium pigments are incorporated in the furnish. All these added advantages are obtained without any sacrifice in other characteristics such as tear, tensile, etc.

What is claimed is:

1. In a process for the manufacture of paper, wherein a furnish is prepared, the step which comprises adding to said furnish a hydrated calcium silicate pigment having an $SiO_2/CaO$ mol ratio limited by a maximum value of about 5:1 and a bound water content limited by a maximum value of about 10% by weight of said pigment and adjusting the pH to a value within the range of about 4.5–6.5.

2. A process according to claim 1 wherein the bound water content of said pigment added to said furnish is about 3.5% by weight of said pigment.

3. A paper furnish having a pH within the range of about 4.5–6.5 comprising as a filler a hydrated calcium silicate pigment having an $SiO_2/CaO$ mol ratio limited by a maximum value of about 5:1 and a bound water content limited by a maximum value of about 10% by weight of said pigment.

4. A paper furnish according to claim 3 wherein the bound water content of said pigment in said furnish is about 3.5% by weight of said pigment.

5. In a paper product which is prepared by forming a sheet from a furnish comprising pulp, sizing material and a filler and subsequently drying said sheet, the improvement which comprises employing as a filler a calcium silicate pigment having an $SiO_2/CaO$ mol ratio limited by a maximum value of about 5:1 and a bound water content limited by a maximum value of about 10% by weight of said pigment and adjusting the pH of said furnish to a value within the range of about 4.5–6.5.

References Cited in the file of this patent

UNITED STATES PATENTS

| | | |
|---|---|---|
| 2,237,374 | Smith | Apr. 8, 1941 |
| 2,247,355 | Brown | July 1, 1941 |
| 2,554,934 | Ayers | May 29, 1951 |
| 2,599,094 | Craig | June 3, 1952 |
| 2,739,068 | Eichmeier | Mar. 20, 1956 |

FOREIGN PATENTS

| | | |
|---|---|---|
| 381,697 | Great Britain | Oct. 13, 1932 |

Notice of Adverse Decision in Interference

In Interference No. 91,634 involving Patent No. 2,919,222, G. E. Hall, Jr., Paper making process and product, final judgment adverse to the patentee was rendered Oct. 24, 1962, as to claims 1, 2, 3, 4 and 5.

[*Official Gazette October 27, 1964.*]